(12) United States Patent
Venkatesan et al.

(10) Patent No.: US 7,095,873 B2
(45) Date of Patent: Aug. 22, 2006

(54) WATERMARKING VIA QUANTIZATION OF STATISTICS OF OVERLAPPING REGIONS

(75) Inventors: Ramarathnam Venkatesan, Redmond, WA (US); M. Kivanc Mihcak, Redmond, WA (US); Mustafa Kesal, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 10/187,073

(22) Filed: Jun. 28, 2002

(65) Prior Publication Data

US 2004/0001605 A1 Jan. 1, 2004

(51) Int. Cl.
*G06K 9/00* (2006.01)
(52) U.S. Cl. .............................. 382/100; 380/54
(58) Field of Classification Search .................. None
See application file for complete search history.

(56) References Cited

U.S. PATENT DOCUMENTS

| | | | |
|---|---|---|---|
| 4,773,039 A | 9/1988 | Zamora | |
| 5,210,820 A | 5/1993 | Kenyon | |
| 5,351,310 A | 9/1994 | Califano et al. | |
| 5,465,353 A | 11/1995 | Hull et al. | |
| 5,535,020 A | 7/1996 | Ulichney | |
| 5,613,004 A | 3/1997 | Cooperman et al. | |
| 5,664,016 A | 9/1997 | Preneel et al. | |
| 5,687,236 A | 11/1997 | Moskowitz et al. | |
| 5,689,639 A | 11/1997 | Schwarz | |
| 5,774,588 A | 6/1998 | Li | |
| 5,802,518 A | 9/1998 | Karaev et al. | |
| 5,809,498 A | 9/1998 | Lopresti et al. | |
| 5,875,264 A | 2/1999 | Carlstrom | |
| 5,899,999 A | 5/1999 | De Bonet | |
| 5,915,038 A | 6/1999 | Abdel-Mottaleb et al. | |
| 5,918,223 A | 6/1999 | Blum et al. | |
| 5,953,451 A | 9/1999 | Syeda-Mahmood | |
| 6,081,893 A | 6/2000 | Grawrock et al. | |
| 6,101,602 A | 8/2000 | Fridrich | |
| 6,314,192 B1 | 11/2001 | Chen et al. | |
| 6,321,232 B1 | 11/2001 | Syeda-Mahmood | |
| 6,363,381 B1 | 3/2002 | Lee et al. | |
| 6,363,463 B1 | 3/2002 | Mattison | |
| 6,370,272 B1 | 4/2002 | Shimizu | |
| 6,477,276 B1 * | 11/2002 | Inoue et al. | 382/232 |
| 6,522,767 B1 | 2/2003 | Moskowitz et al. | |
| 6,532,541 B1 | 3/2003 | Chang et al. | |
| 6,546,114 B1 | 4/2003 | Venkatesan et al. | |

(Continued)

FOREIGN PATENT DOCUMENTS

EP 0581317 2/1994

(Continued)

OTHER PUBLICATIONS

Chen, B. et al., "Achievable Performance of Digital Watermarking Systems," Multimedia Computing & Systems, 1999. IEEE Int'l. Conference on, Florence, Italy, Jun. 7-11, 1999, Los Alamitos, CA, USA, IEEE Comput. Soc, US, Jun. 7, 1999, pp. 13-18.

(Continued)

*Primary Examiner*—Bhavesh M. Mehta
*Assistant Examiner*—Christopher Lavin
(74) *Attorney, Agent, or Firm*—Lee & Hayes, PLLC

(57) ABSTRACT

An implementation of a technology, described herein, for facilitating watermarking of digital goods. At least one implementation, described herein, performs quantization watermarking based upon semi-global characteristics of multiple regions of the digital good. Such regions are permissively overlapping. The scope of the present invention is pointed out in the appending claims.

11 Claims, 9 Drawing Sheets

U.S. PATENT DOCUMENTS

| | | |
|---|---|---|
| 6,574,348 B1 | 6/2003 | Venkatesan et al. |
| 6,584,465 B1 | 6/2003 | Zhu et al. |
| 6,625,295 B1 | 9/2003 | Wolfgang et al. |
| 6,647,128 B1 | 11/2003 | Rhoads |
| 6,671,407 B1 | 12/2003 | Venkatesan et al. |
| 6,674,861 B1 | 1/2004 | Xu et al. |
| 6,687,416 B1 | 2/2004 | Wang |
| 6,700,989 B1 | 3/2004 | Itoh et al. |
| 6,701,014 B1 | 3/2004 | Syeda-Mahmood |
| 6,751,343 B1 | 6/2004 | Ferrell et al. |
| 6,754,675 B1 | 6/2004 | Abdel-Mottaleb et al. |
| 6,768,809 B1 | 7/2004 | Rhoads et al. |
| 6,782,361 B1 | 8/2004 | El-Maleh et al. |
| 6,799,158 B1 | 9/2004 | Fischer et al. |
| 6,839,673 B1 | 1/2005 | Choi et al. |
| 6,990,453 B1 | 1/2006 | Wang et al. |
| 2002/0126872 A1 | 9/2002 | Brunk et al. |
| 2003/0056101 A1* | 3/2003 | Epstein ...................... 713/176 |

FOREIGN PATENT DOCUMENTS

| | | |
|---|---|---|
| EP | 1 253 784 A2 | 10/2002 |
| JP | 2000149004 | 5/2000 |
| JP | 2000261655 | 9/2000 |
| JP | 2000332988 | 11/2000 |
| WO | WO 99/17537 | 4/1999 |
| WO | WO 99/18723 | 4/1999 |
| WO | WO 99/60514 | 11/1999 |
| WO | WO 01/11890 | 2/2001 |
| WO | WO 01/28230 | 4/2001 |
| WO | WO 02/37331 A1 | 5/2002 |

OTHER PUBLICATIONS

Chen, B. et al., "Quantization Index Modulation Methods for Digital Watermarking and Information Embedding of Multimedia," Journal of VLSI Signal Processing Systems for Signal. Image, & Video Technology, Kluwer Academic Publishers, Dordrecht, NL, vol. 27, No. 1/2, Feb. 2001, pp. 7-33.
M. Kivanc Mihcak et al., "Blind Image Watermarking Via Derivation and Quantization of Robust Semi-Global Statistics," 2002 IEEE Int'l. Conference on Acoustics, Speech, & Signal Processing Proceedings (Cat. No. 02CH37334), Proceedings of Int'l. Conf. on Acoustics . . . , May 13-17, 2002, pp. IV-3453-IV3456, vol. 4.
Mihcak et al., "Watermarking via Optimization Algorithms for Quantizing Randomized Statistics of Image Regions" Proceedings of the Annual Allerton Conference on Communication Control and Computing Urbana IL 2002 10 pages.
Moulin et al., "The Parallel-Gaussian Watermarking Game" IEEE Transactions Information Theory Feb. 2004 pp. 1-36.
Venkatesan et al., "Robust Image Hashing" Proceedings of the IEEE-ICIP Vancouver BC Canada 2000 3 pages.
Chang et al."RIME: A Replicated Image Detector for the World-Wide Web" Proceedings of the SPIE vol. 3527 Nov. 2-4, 1998 pp. 58-67.
Mihcak et al.,"New Iterative Geometric Methods for Robust Perceptual Image Hashing" Proceedings of the Security and Privacy Digital Rights Management Workshop 2001 9 pages.
Kesal et al., "Iteratively Decodable Codes for Watermarking Applications" Proceedings of the Second Symposium on Turbo Codes and Their Applications France Sep. 2000 4 pages.
Venkatesan et al.,"Image Watermarking with Better Resilience" Proceedings of IEEE-ICIP Vancouver BC Canada 2000 4 pages.
Mihcak et al.,"Cryptanalysis of Discrete-Sequence Spread Spectrum Watermarks" Proceedings of the Information Hiding Workshop Holland 2002 21 pages.
Mihcak et al., "A Perceptual Audio Hashing Algorithm: A Tool For Robust Audio Identification and Information Hiding" Proceedings of the Information Hiding Workshop 2001 15 pages.
Malvar,"A Modulated Complex Lapped Transform and its Applications to Audio Processing" IEEE ICASSP'99 Phoenix AZ. Mar. 1999 pp. 1-4.
Moulin et al., "A Framework for Evaluating the Data-Hiding Capacity of Image Sources" IEEE Transactions on Image Processing vol. 11 No. 9 Sep. 2002 pp. 1-14.
Wu et al.,Video Access Control Via Multi-level Data Hiding' Proc. IEEE Int. Conf. on Multimedia and Expo vol. I Jul./Aug. 2000 pp. 381-384.
Fridrich et al.,"Robust Hash Functions for Digital Watermarking" Proc. Int. Conf. on Information Technology: Coding and Computing Mar. 2000 pp. 178-183.
Lee et al., "Adaptive Video Watermarking Using Motion Information" Proc SPIE vol. 3971: Security and Watermarking of Multimedia Contents II Jan. 2000 pp. 209-216.
Echizen et al.,"General Quality Maintenance Module for Motion Picture Watermarking" IEEE Trans. on Consumer Electronics vol. 45 No. 4. Nov. 1999 pp. 1150-1158.
Lin et al., "A Robust Image Authentication Method Distinguishing JPEG Compression from Malicious Manipulation", IEEE Transactions, Feb. 2001, vol. 11, No. 2, pp. 153-168.
Schneider et al., "A Robust Content Based Digital Signature for Image Authentication". Proceedings, International Conference, Sep. 1996, vol. 3, pp. 227-230.
M. D. Swanson, B. Zhu and B. Chau, "Object based transparent video watermarking," Proceedings of IEEE Signal Processing Society 1997 Workshop on Multimedia Signal Processing, Jun. 23-25, 1997, Princeton, New Jersey, USA.
M. K. Mihçak and R. Venkatesan, "A tool for robust audio information hiding: A perceptual audio hashing algorithm," submitted to Workshop on Information Hiding, Pittsburgh, PA, 2001.
T. Kalker and J. Haitsma, "Efficient detection of a spatial spread-spectrum watermark in MPEG video streams," Proc. IEEE ICIP, Vancouver, Canada, Sep. 2000.
F. A. P. Petitcolas and R. J. Anderson, "Evaluation of copyright marking systems," Proceedings of IEEE Multimedia Systems'99, vol. 1, pp. 574-579, Jun. 7-11, 1999, Florence, Italy.
I. J. Cox, J. Killian, T. Leighton, and T. Shamoon, "A secure robust watermark for multimedia," Information Hiding Workshop, University of Cambridge, pp. 185-206, 1996.
J. Dittman, M. Stabenau and R. Steinmetz, "Robust MPEG video watermarking technologies," Proceedings of ACM Multimedia '98, The 6th ACM International Multimedia Conference, Bristol, England, pp. 71-80.
B. Chen and G. W. Wornell, "Digital watermarking and information embedding using dither modulation," Proc. IEEE Workshop on Multimedia Signal Processing, Redondo Beach, CA, pp. 273-278, Dec. 1998.
Politis et al., "An Audio Signatures Indexing Scheme for Dynamic Content Multimedia Databases", Electrotechnical Conference, 2000. IEEE, vol. 2, May 29, 2000, pp. 725-728.
Chang et al., "A Spatial Match Representation Scheme for Indexing and Querying In Iconic Image Databases", 1997, ACM, Retrieved from the Internet http://portal.acm.org/citation.cfm?id=266890 &coil=ACM&dl=ACM&CFID=68519948 &CFTOKEN=85922645.
El-Kwae et al., "Efficient Content-Based Indexing of Large Image Databases", Apr. 2000, ACM, Retrieved from the Internet: http://portal.acm.org/citation.cfm?id=348762&coil=ACM&dl=ACM &CFID=68519046&CFTOKEN=85922645.
Lambrou et al, "Classification of Audio Signals Using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 8, pp. 3621-3624.
Moreno et al., "Using the Fisher Kernel Method for Web Audio Classification", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2417-2420.
Pye, D., "Content-Based Methods for the Management of Digital Music", Acoustics, Speech, and Signal Processing, 2000. ICASSP '00. Proceedings. 2000 IEEE International Conference on Jun. 5-9, 2000, Piscataway, NJ, USA, IEEE, vol. 6, 2437-2440.

* cited by examiner

WATERMARKING VIA QUANTIZATION OF STATISTICS OF OVERLAPPING REGIONS

TECHNICAL FIELD

This invention generally relates to a technology for facilitating watermarking of digital goods.

BACKGROUND

Digital goods are often distributed to consumers over private and public networks—such as Intranets and the Internet. In addition, these goods are distributed to consumers via fixed computer readable media, such as a compact disc (CD-ROM), digital versatile disc (DVD), soft magnetic diskette, or hard magnetic disk (e.g., a preloaded hard drive).

Unfortunately, it is relatively easy for a person to pirate the pristine digital content of a digital good at the expense and harm of the content owners—which includes the content author, publisher, developer, distributor, etc. The content-based industries (e.g., entertainment, music, film, etc.) that produce and distribute content are plagued by lost revenues due to digital piracy.

Modern digital pirates effectively rob content owners of their lawful compensation. Unless technology provides a mechanism to protect the rights of content owners, the creative community and culture will be impoverished.

"Digital goods" is a generic label for electronically stored or transmitted content. Examples of digital goods include images, audio clips, video, multimedia, software, and data. Digital goods may also be called a "digital signal," "content signal," "digital bitstream," "media signal," "digital object," "object," and the like.

Watermarking

Watermarking is one of the most promising techniques for protecting the content owner's rights of a digital good. Generally, watermarking is a process of altering the digital good such that its perceptual characteristics are preserved. More specifically, a "watermark" is a pattern of bits inserted into a digital good that may be used to identify the content owners and/or the protected rights.

Generally, watermarks are designed to be invisible or, more precisely, to be imperceptible to humans and statistical analysis tools.

A watermark embedder (i.e., encoder) is used to embed a watermark into a digital good. A watermark detector is used to detect (or extract) the watermark in the watermarked digital good. Watermark detection is often performed in real-time even on small devices.

Blind Watermarking

To detect the watermark, some watermarking techniques require access to the original unmarked digital good or to a pristine specimen of the marked digital good. Of course, these techniques are not desirable when the watermark detector is available publicly. If publicly available, then a malicious attacker may get access to the original unmarked digital good or to a pristine specimen of the marked digital good. Consequently, these types of techniques are not used for public detectors.

Alternatively, watermarking techniques are "blind." This means that they do not require access to the original unmarked digital good or to a pristine specimen of the marked digital good. Of course, these "blind" watermarking techniques are desirable when the watermark detector is publicly available.

Conventional Watermarkinig Technology

Conventional technologies for watermarking media signals rely on the imperfections of human perceptions (e.g., the human auditory system (HAS) or the human visual system (HVS)). For example, in the realm of audio signals, several conventional secret hiding techniques explore the fact that the HAS is insensitive to small amplitude changes—either in the time or frequency domains—as well as insertion of low-amplitude time-domain echoes.

The watermark can be regarded as an additive signal w, which contains the encoded and modulated watermark message b under constraints on the introduced perceptible distortions given by a mask M so that:

$$x=s+w(M).$$

Commonly-used conventional watermark embedding techniques can be classified into spread-spectrum (SS) (which is often implemented using additive or multiplicative techniques) and quantization-based watermarking schemes.

Those of ordinary skill in the art are familiar with conventional techniques and technology associated with watermarks, watermark embedding, and watermark detecting.

Robustness

In most watermarking applications, the marked goods are likely to be processed in some way before it reaches the receiver of the watermarked content. The processing could be lossy compression, signal enhancement, or digital-to-analog (D/A) and analog-to-digital (A/D) conversion. An embedded watermark may unintentionally or inadvertently be impaired by such processing. Other types of processing may be applied with the explicit goal of hindering watermark reception. This is an attack on the watermark (or the watermarked good) by a so-called adversary.

In watermarking terminology, an attack may be thought of as any processing that may impair detection of the watermark or communication of the information conveyed by the watermark or intends to do so. Also, an attack may create a false alarm on an un-watermarked content to appear as if it is watermarked. The processed watermarked goods may be then called attacked goods.

Of course, key aspect of a watermarking technology is its robustness against attacks. The notion of robustness is intuitively clear to those of ordinary skill in the art: A watermark is robust if it cannot be impaired without also rendering the attacked goods less useful.

Watermark impairment can be measured by several criteria, for example: miss probability, probability of bit error, or channel capacity. For multimedia, the usefulness of the attacked data can be gauged by considering its perceptual quality or distortion. Hence, robustness may be evaluated by simultaneously considering watermark impairment and the distortion of the attacked good.

False Alarms & Misses

When watermarking, one does not want a high probability of a false alarm. That is when a watermark is detected, but none was inserted into the content by the watermarking agent. This is something like finding evidence of a crime that did not happen. Someone may be falsely accused of wrongdoing.

As the probability of false alarms increases, the confidence in the watermarking technique decreases. For example, people often ignore car alarms because they know that more often than not it is a false alarm rather than an actual car theft.

Likewise, one does not want a high probability of a miss. An event of "miss" happens when watermark is not detected (i.e., declared to be not present) although it was supposed to be detected. This is something like being unable to detect the evidence in a crime scene either by oversight or inability to do so. Because of this, a wrongdoing may never be properly investigated. As the probability of misses increases, the confidence in the watermarking technique decreases.

Ideally, the probabilities of a false alarm and a miss are zero. In reality, a compromise is often made between them. Typically, a decrease in the probability of one increases the probability of the other. For example, as the probability of false alarm is decreased, the probability of a miss increases.

Consequently, it is desirable to minimizes both while finding a proper balance between them.

SUMMARY

Described herein is a technology for facilitating watermarking of digital goods.

The technology, described herein, performs watermarking based upon non-local characteristics of multiple regions of the digital good. Such regions are permissively overlapping.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of a Watermarking via Quantization of Statistics of Overlapping Regions that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Watermarking via Quantization of Statistics of Overlapping Regions may be referred to as an "exemplary watermarker."

Introduction

Figure 10:
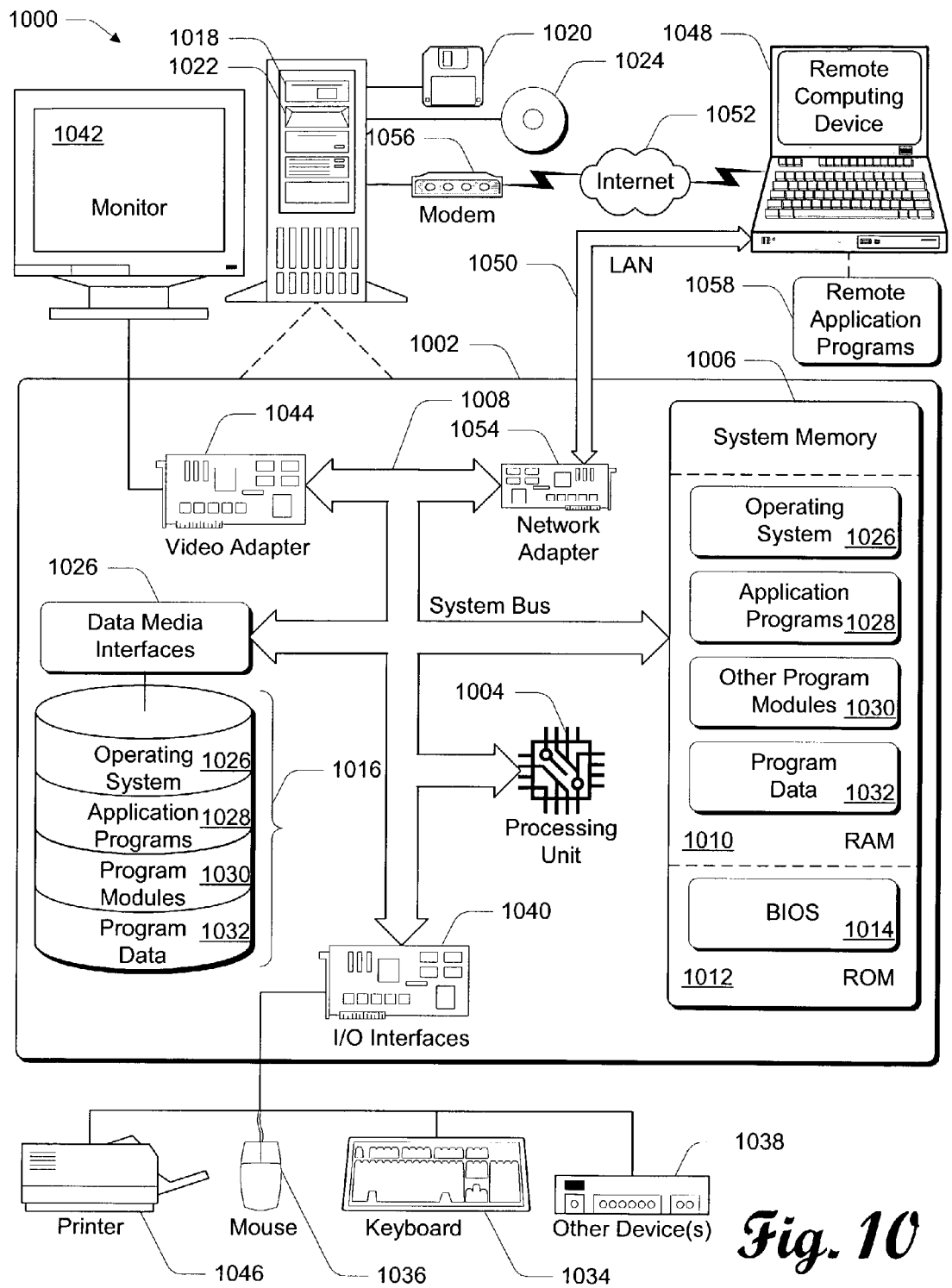
FIG. 10 is an example of a computing operating environment capable of implementing at least one embodiment (wholly or partially) described herein.

The exemplary watermarker may be implemented (wholly or partially) on computing systems and computer networks like that show in FIG. 10. Furthermore, the exemplary watermarker may be implemented (wholly or partially) on a digital goods validation system like that show in FIG. 10. Although the exemplary watermarker may have many applications, cryptosystems, authorization, and security are examples of particular applications.

The exemplary watermarker relates to watermarking digital goods via quantization of the content. One implementation, described herein, watermarks are embedded via quantization of random linear statistics of randomly chosen regions of content. Such an implementation may employ overlapping regions of the content, which enhances the watermark robustness and security properties.

In general, the exemplary watermarker derives robust semi-global characteristics of a digital good. It quantizes such characteristics for blind watermarking of the digital good.

When randomization is mentioned herein, it should be understood that the randomization is carried out by means of a pseudorandom number generator whose seed is the secret key (K), where this key is known to both the watermark embedder and detector. It is, however, unknown to the adversary.

Exemplary Semi-Global Watermarking Architecture

Figure 1:
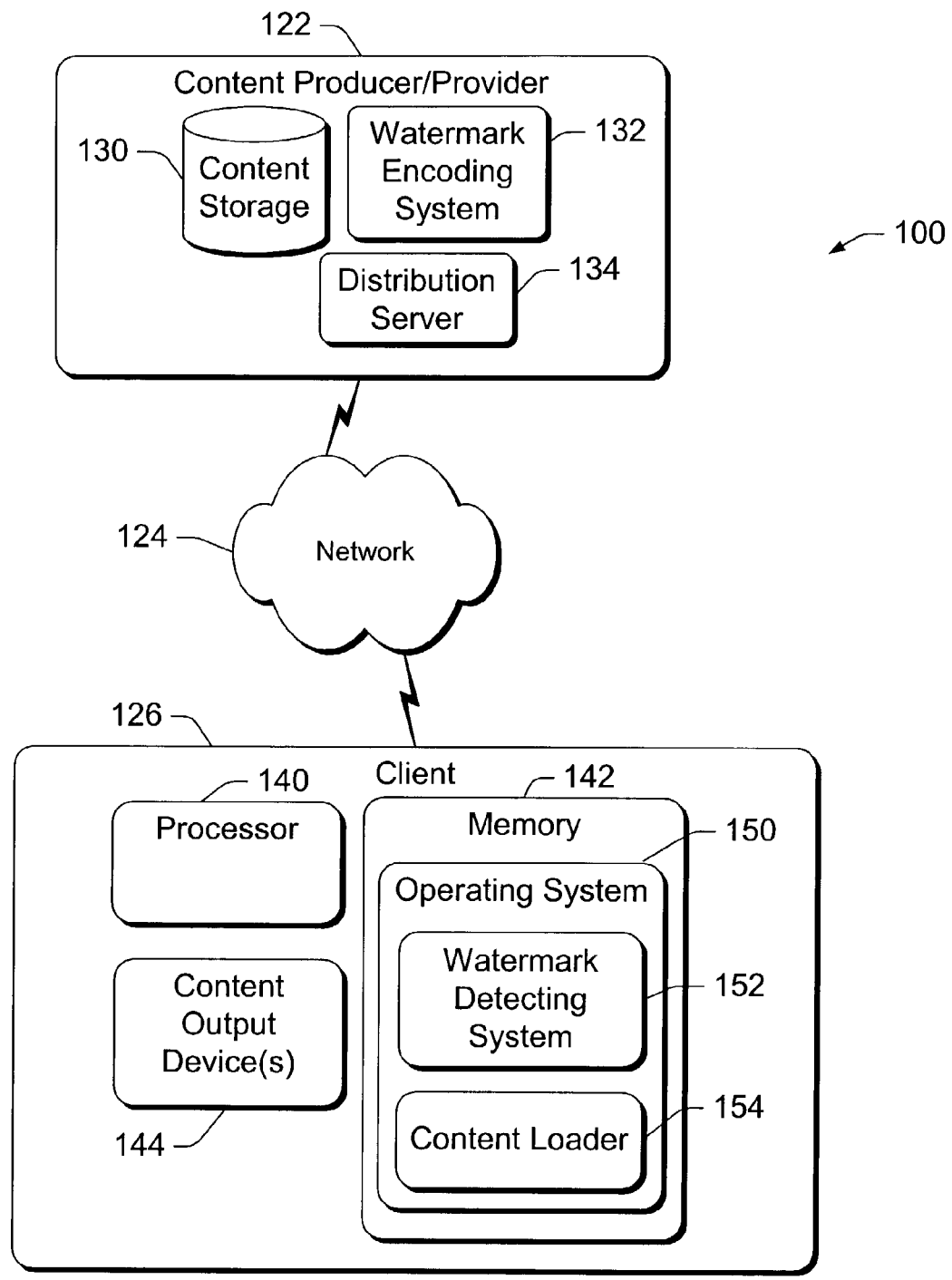
FIG. 1 is a schematic block diagram showing a watermarking architecture in accordance with an implementation described herein.

FIG. 1 shows a digital goods production and distribution architecture 100 (i.e., digital goods validation system) having a content producer/provider 122 that produces original content and distributes the content over a network 124 to a client 126. The content producer/provider 122 has a content storage 130 to store digital goods containing original content. The content producer 122 has a watermark embedding system 132 to sign the digital signals with a watermark that uniquely identifies the content as original. The watermark embedding system 132 may be implemented as a standalone process or incorporated into other applications or an operating system.

The watermark embedding system 132 applies the watermark to a digital signal from the content storage 130. Typically, the watermark identifies the content producer 122, providing a signature that is embedded in the signal and cannot be cleanly removed.

The content producer/provider 122 has a distribution server 134 that distributes the watermarked content over the network 124 (e.g., the Internet). A signal with a watermark embedded therein represents to a recipient that the signal is being distributed in accordance with the copyright authority of the content producer/provider 122. The server 134 may further compress and/or encrypt the content conventional compression and encryption techniques prior to distributing the content over the network 124.

Typically, the client 126 is equipped with a processor 140, a memory 142, and one or more content output devices 144 (e.g., display, sound card, speakers, etc.). The processor 140 runs various tools to process the marked signal, such as tools to decompress the signal, decrypt the date, filter the content, and/or apply signal controls (tone, volume, etc.). The memory 142 stores an operating system 150 (such as a Microsoft® Windows XP® operating system), which executes on the processor. The client 126 may be embodied in many different ways, including a computer, a handheld entertainment device, a set-top box, a television, an appliance, and so forth.

The operating system 150 implements a client-side watermark detecting system 152 to detect watermarks in the digital signal and a content loader 154 (e.g., multimedia player, audio player) to facilitate the use of content through the content output device(s) 144. If the watermark is present, the client can identify its copyright and other associated information.

The operating system 150 and/or processor 140 may be configured to enforce certain rules imposed by the content producer/provider (or copyright owner). For instance, the operating system and/or processor may be configured to reject fake or copied content that does not possess a valid watermark. In another example, the system could load unverified content with a reduced level of fidelity.

Exemplary Watermarker

The exemplary watermarker derives pseudorandom statistics of pseudo-randomly chosen regions, where these regions may permissively overlap. The statistics derivation is carried out in the transform domain (possibly wavelets for images and MCLT for audio).

Examples of such pseudo-random statistics may be linear statistics. These linear statistics of a (pseudo-randomly) chosen region are given by weighted linear combination of data in that region (where weights are chosen pseudo-randomly).

In order to embed watermark information, the exemplary watermarker quantizes these statistics given multiple (e.g., two) quantizers. Although the exemplary watermarker, described herein, focuses on scalar uniform quantization, the quantizers can in general be vector quantizers. For example, lattice vector quantizers may be used because they may be more tractable for high dimensional quantization.

Furthermore, the exemplary watermarker may use error correction codes to add controlled redundancy to the message to be transmitted in order to produce the watermark vector that shall be embedded (controlled redundancy is added to the message, not to the watermarked good). The decoder uses ML (Maximum-Likelihood) decoding or possibly an approximation to it (e.g., nearest neighbor decoding) in order to decide which quantizer was most likely used. In case of usage of error correction codes, the approximate ML decoder is followed by iterative error correction decoding to decode the message to improve the performance.

Typically, the decision on the existence of a watermark is carried out via thresholding of a distance between the embedded watermark and the watermarked that we would like to detect. An example of such a distance could be Hamming distance. Of course, other perceptual distance metrics may be employed. Yet another method for decoding would be soft decoding instead of hard decoding where the detector applies thresholding to the log-likelihood ratio of the decision statistics in order to reach a decision.

The exemplary watermarker is not limited to non-overlapping regions. Rather, it permits overlapping regions. The exemplary watermarker initially generates a quantization noise sequence using the minimum norm criterion. The existence of such a noise sequence is guaranteed under some mild assumptions.

There are, at least, two approaches for the exemplary watermarker. In one approach, the norm of the additive noise introduced in quantization is minimized. In another approach, the distance of multiplicative noise to unity introduced in quantization is minimized.

Local Characteristics

Conventional quantization watermarking relies upon local characteristics within a signal (i.e., a digital good). To quantize, conventional quantization watermarking relies exclusively upon the values of "individual elements" of the host signal. When quantizing, only the local characteristics of an "individual element" are considered. These local characteristics may include value (e.g., color, amplitude) and relative positioning (e.g., positioning in time and/or frequency domains) of an individual pixel or transform coefficient.

Modifications—from either an attack or unintentional noise—can change local characteristics of a signal quite dramatically without being perceptually significant (i.e., audible or visible). For example, these modifications may have a dramatic affect on the value of a pixel or relevant transform coefficients or the amplitude of a sample of an audio clip, without being perceptible. However, such modifications are expected to have little effect on the semi-global characteristics of a signal. In fact, having little effect is desirable for our design method, where we embed information to the semi-global characteristics.

Semi-Global Characteristics

Semi-global characteristics are representative of general characteristics of a group or collection of individual elements. As an example, they may be statistics or features of "regions" (i.e., "segments"). Semi-global characteristics are not representatives of the individual local characteristics of the individual elements; rather, they are representatives of the perceptual content of the group (e.g., segments) as a whole.

The semi-global characteristics may be determined by a mathematical or statistical representation of a group. For example, it may be an average of the color values of all pixels in a group. Consequently, such semi-global characteristics may also be called "statistical characteristics." Local characteristics do not represent robust statistical characteristics.

Overlapping Regions

The regions for watermarking of robust semi-global characteristics may be permissively contiguous with each other or not. Contiguous regions may also be described as overlapping. Thus, such watermarking methods may be defined, in part, as the methods which employ regions that are either permissively overlapping or restrictively non-overlapping.

Figure 2:
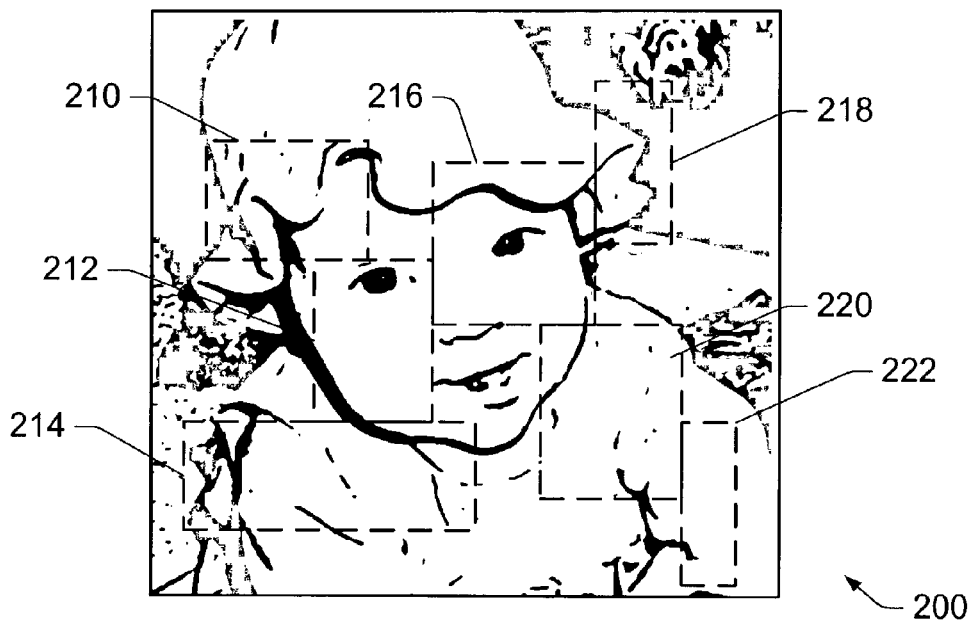
FIG. 2 shows an image with examples of regions employed by an implementation that is restrictively non-overlapping.

FIG. 2 illustrates an image 200 with multiple non-overlapping regions 210–222. In FIG. 2, the regions are rectangles. They are also adjacent and non-contiguous. Herein, non-contiguous is non-overlapping. Note that none of the illustrated rectangles 210–220 cover common image area. The rectangles of FIG. 2 illustrate an example of a pseudorandom configuration of regions that are restrictively non-overlapping.

The following pending patent application describes one or more implementations statistics quantization watermarking where regions are restrictively non-overlapping: Pending U.S. patent application Ser. No. 09/843,279, filed on Apr. 24, 2001, titled "Derivation and Quantization Of Robust Non-Local Characteristics For Blind Watermarking" and assigned to Microsoft Corporation.

With a statistics quantization watermarking method, that embeds the watermark in the statistics of strictly non-overlapping regions, the effect of the watermarking is dispersed over a reproducible pseudorandomly selected region (such as region 218). Overlapping of these regions is restricted because the effect of watermarking in one region does not affect another in non-overlapping case. If they were to overlap, then the cross-effects may counteract each other; thus, it is difficult (i.e., non-trivial) to design quantization noise vectors to achieve watermarking via statistics quantization.

However, prohibiting the usage of overlapping regions introduces undesirable limitations. Some of those limitations are in terms of the rate of the embedding of the watermark and the size and/or quantity of regions. Restricting overlap introduces perceptible artifacts around the boundaries of the non-overlapping regions. Therefore, the watermark may be easier for an adversary to discover and/or impair.

The exemplary watermarker, described herein, is not restricted to non-overlapping regions. Rather, it employs permissively overlapping regions.

Figure 3:
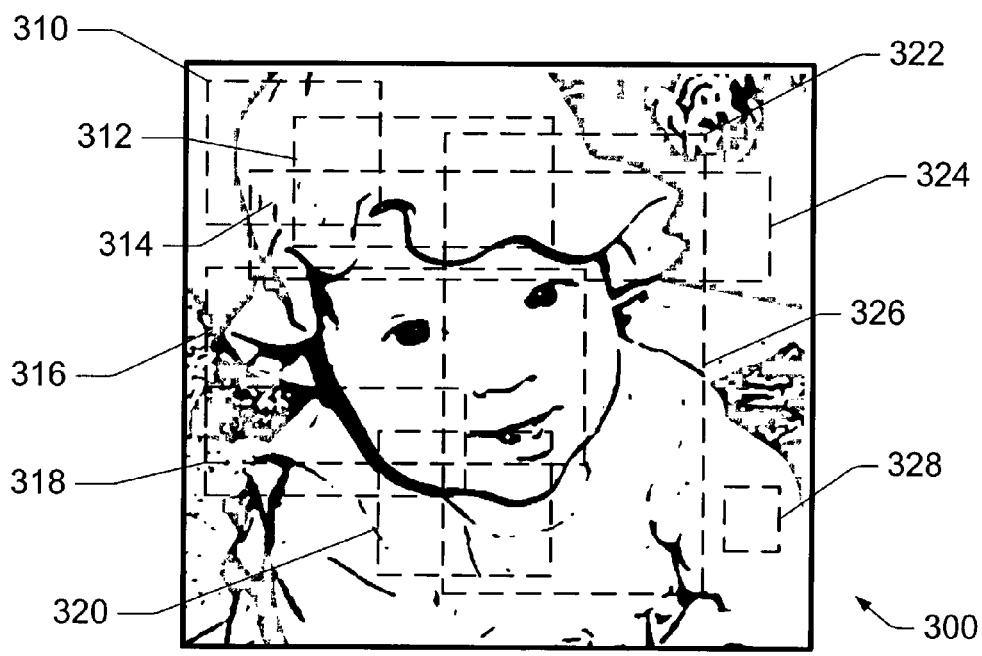
FIG. 3 shows an image with examples of regions employed by an implementation, in accordance with at least one described herein, that is permissively overlapping.

FIG. 3 illustrates an image 300 with multiple overlapping regions 310–328. In FIG. 3, the regions are rectangles. Note that many of the illustrated rectangles 310–326 cover common image areas. Some rectangles (such as 328) do not cover any common and is not adjacent to any other rectangle. The rectangles of FIG. 3 illustrate an example of a pseudorandom configuration of regions that are permissively overlapping.

With the exemplary watermarker, it is possible to overlap regions. In general, it is a trivial task to design quantization noise vectors with non-overlapping regions compared to overlapping regions (in which case it becomes non-trivial). With the exemplary watermarker, a quantization noise vector may be globally designed to achieve watermarking of possibly-overlapping regions. We find the desired quantization noise vector as a solution to an optimization problem.

Consequently, the exemplary watermarker avoids some of the limitations that were encountered in case of non-overlapping regions (e.g., the rate of the embedded watermark and the size and/or quantity of regions that are used in watermark embedding). It also avoids introduction of perceptible artifacts around the boundaries of the non-overlapped regions.

Exemplary Semi-Global Watermark Embedding System

Figure 4:
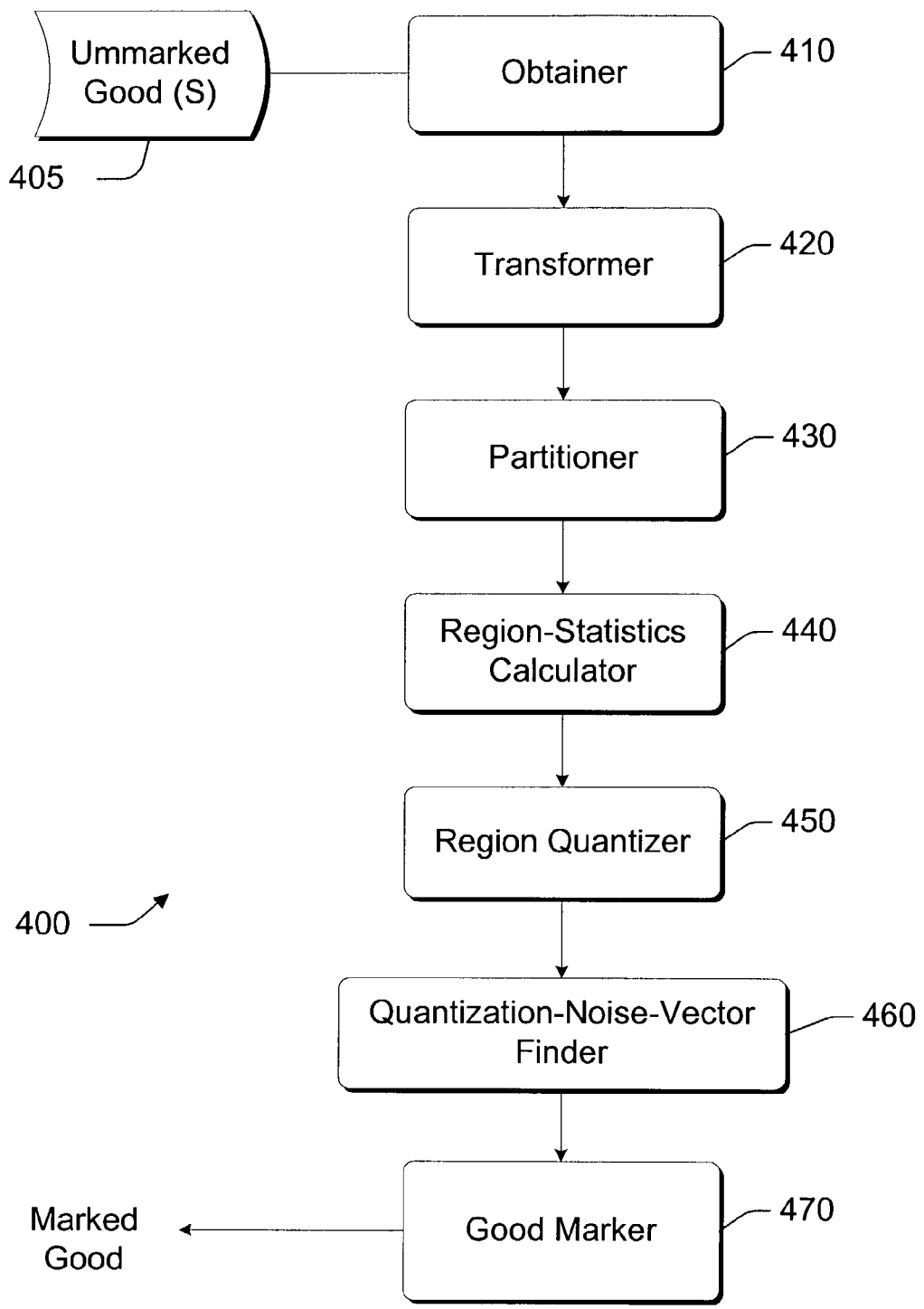
FIG. 4 is a schematic block diagram showing an embodiment (e.g., a watermark embedding system) described herein.

FIG. 4 shows an exemplary statistics quantization watermark embedding system 400, which is an example of an embodiment of a portion of the digital goods validation system. This system may be employed as the watermark encoding system 132 of FIG. 1.

The watermark embedding system 400 includes a goods obtainer 410, a transformer 420, a partitioner 430, region-statistics calculator 440, a region quantizer 450, a quantization-noise-vector finder 460, and a goods marker 470.

The watermark embedding system 400 embeds a watermark into a digital good. In this example, digital good is an image. Thus, the system 400 embeds a watermark in the DC subband of a discrete wavelet transform (DWT) via quantization of first order statistics of pseudorandomly chosen regions. Of course, other statistics, subbands, and transforms may be employed.

The watermark embedding system 400 may minimize the "norm of additive quantization disturbance" (see equation (1.2) below). Alternatively, it may minimize the "distance of multiplicative quantization disturbance to unity" (see equation (1.7) below).

The goods obtainer 410 obtains a digital good 405 (such as an audio signal or a digital image). It may obtain the good from nearly any source, such as a storage device or over a network communications link. In addition to obtaining, the goods obtainer 410 may also normalize the amplitude of the good. In that case, it may also be called an amplitude normalizer.

The transformer 420 receives the good from the goods obtainer 410. The transformer 420 puts the good in canonical form using a set of transformations. Specifically, discrete wavelet transformation (DWT) may be employed (particularly, when the input is an image) since it compactly captures significant signal characteristics via time and frequency localization. Other transformations may be used. For instance, shift-invariant and direction-selective "complex wavelets" and some other suitable overcomplete wavelet representations (e.g., steerable pyramids, etc.) or even wavelet packets may be good candidates (particularly for images).

The transformer 420 also finds the DC subband of the initial transformation 11 of the signal. This DC subband of the transformed signal is passed to the partitioner 430.

If, for example, the good is an image I, the transformer 420 may resize it to a fixed size via interpolation and decimation; apply DWT to resulting image and obtain the DC subband, $I_{DC}$. Let N be the number of coefficients in $I_{DC}$. The transformer 420 reorders $I_{DC}$ to get N×1 host data s.

The partitioner 430 separates the transformed good into multiple, pseudorandomly sized, pseudorandomly positioned regions (i.e., partitions). Such regions may overlap. A secret key K is the seed for pseudorandom number generation here. This same K may be used to reconstruct the regions by an exemplary semi-global statistics quantization watermark detecting system 500.

For example, if the good is an image, it might be partitioned into two-dimensional polygons (e.g., regions) of pseudorandom size and location. In another example, if the good is an audio signal, a two-dimensional representation (using frequency and time) of the audio clip might be separated into two-dimensional polygons (e.g., triangles) of pseudorandom size and location.

In this implementation, the regions may indeed overlap with each other.

If, for example, the good is the above-referenced image I, the partitioner 430 pseudorandomly generates sufficiently large M polygons (e.g., regions) represented by $$\{R_i\}_{i=1}^{M}$$

together with corresponding strictly positive pseudorandom weight vectors $$\{\alpha_i\}_{i=1}^{M},$$

thereby forming the corresponding pseudorandom transformation matrix $T_1$ of size M×N. Thus, the pseudo-random statistic corresponding to $R_l$ is given by $\mu_i$, where $\{\mu_l\}$ are found via a weighted linear combination of s in $R_l$ (weights are given by the vectors $\{\alpha_1\}$)". Later on, these statistics shall be quantized using the length-M watermark vector w $\in \{0, 1\}^M$.

For each region, the region-statistics calculator 440 calculates statistics of the multiple regions generated by the partitioner 430. Statistics for each region are calculated. In the paragraph above, it is explained how pseudo-random linear statistics are computed; however in general these statistics may be, for example, any finite order moments or some other features that can represent the multimedia object well.

A suitable statistic for such calculation is the mean (e.g., average) of the values of the individual coefficients in each region (averages correspond to special case of choosing the vectors $\{\alpha_1\}$ s.t. they are uniform in regions $\{R_1\}$ and zero everywhere else). Other suitable statistics and their robustness are discussed in Venkatesan, Koon, Jakubowski, and Moulin, "Robust image hashing," *Proc. IEEE ICIP* 2000, Vancouver, Canada, September 2000 for images and in Mihcak and Venkatesan, "A Tool for Robust Audio Information Hiding: A Perceptual Audio Hashing Algorithm", IHW 2001, Pittsburgh Pa. for audio signals. In this document, no information embedding was considered, but similar statistics were discussed.

For each region, the region quantizer 450 applies a possibly high-dimensional (e.g., 2, 3, 4) quantization (e.g., lattice vector quantization) on the output of the region-statistics calculator 440 to obtain quantized data. Of course, other levels of quantization may be employed. The quantizer 450 may be adaptive or non-adaptive. This is the part where data embedding takes place; in the quantization process, one chooses a particular quantizer that is indexed by the watermarking bit that one would like to embed.

This quantization may be done randomly also (thus introducing sufficient pseudo-randomness in the codebook design). This may be called randomized quantization (or randomized rounding). This means that the quantizer may randomly decide to round up or round down. It may do it pseudorandomly (using the secret key). This adds an additional degree of robustness and helps hide the watermark.

The quantization-noise-vector finder 460 finds minimum norm quantization noise vector such that watermarked data (which are given by the sum of the unwatermarked host data and the quantization noise vector) have quantized statistics. It is possible to perceptually "correct" this minimum norm quantization noise vector with a "perceptual compensation vector," c. After adding this perceptual compensation vector to the minimum-norm noise vector, the exemplary watermarker still gets the quantized statistics; however, the marked data have better perceptual quality.

One may utilize several methods to find perceptual compensation vector (like those mentioned herein). The exemplary watermarker uses an iterative technique to find this vector. An example of this iterative method shall be explained shortly.

The perceptual compensation vector that it finds may be based upon a minimum norm of additive quantization disturbance (see equation (1.2) below). Alternatively, it is based on a minimum distance of multiplicative quantization disturbance to unity (see equation (1.7) below). See the "Methodological Applications" section below for more details on implementations for specific applications.

The good marker 470 marks the signal by using designed quantization noise vector (e.g., for additive quantization noise vector method, the designed quantization noise vector is added to the original unmarked data to obtain the marked data). The good marker may mark the good using quantization watermarking techniques. This marked good may be publicly distributed to consumers and clients.

The functions of aforementioned components of the exemplary statistics quantization watermark embedding system 400 of FIG. 4 are explained further below.

Exemplary Quantization Watermark Detecting System

Figure 5:
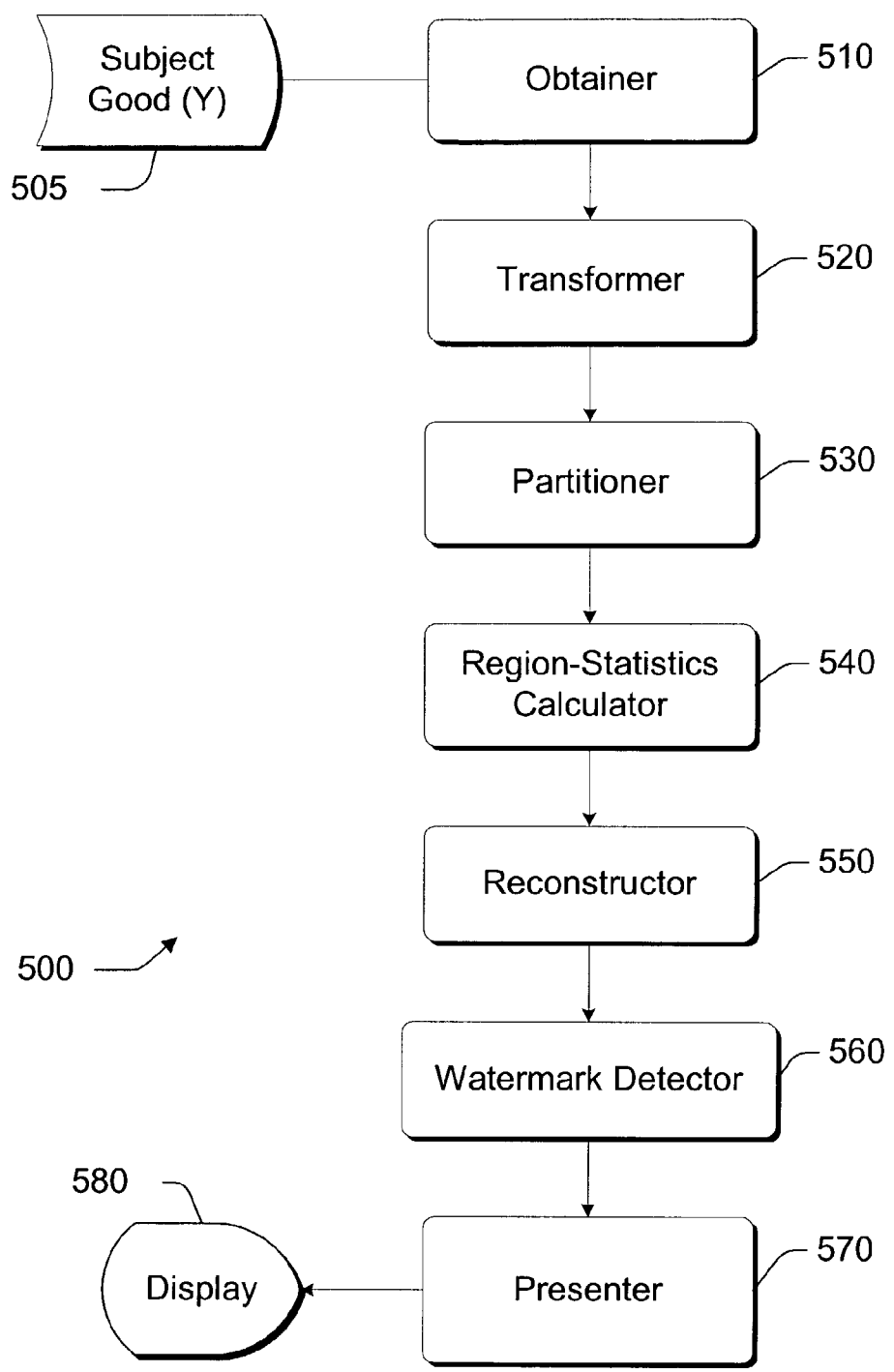
FIG. 5 is a schematic block diagram showing an embodiment (e.g., a watermark detecting system) described herein.

FIG. 5 shows an exemplary statistics quantization watermark detecting system 500, which is an example of an embodiment of a portion of the digital goods validation system. This system may be employed as the watermark detecting system 152 of FIG. 1.

The watermark detecting system 500 includes a goods obtainer 510, a transformer 520, a partitioner 530, segment-statistics calculator 540, a reconstructor 550, a watermark detector 560, a presenter 570, and a display 580.

The goods obtainer 510, the transformer 520, the partitioner 530, and the segment-statistics calculator 540 of the watermark detecting system 500 of FIG. 5 function in a similar manner as similarly labeled components of the watermark embedding system 400 of FIG. 4. The exception is that the object of these components is a "subject good" (Y) rather than the original good (S). The origins of a "subject" good is an unknown. It may or may not include a watermark. It may have been modified.

Let $\mu_y$ be the statistics vector for the subject good Y. For each region i, let $\mu_{yi}$ be the i-th component of the statistics vector $\mu_y$. The reconstructor 550 determines the closest reconstruction point that corresponds to quantizer 0 (quantizer 1), which is called $$\mu_{yi}^{0}(\mu_{yi}^{1}),$$

herein (i.e., performs nearest neighbor decoding).

The watermark detector 560 determines whether a watermark is present. It determines the log likelihood ratio:

$$L = \sum_{i=1}^{M} (-1)^{w_i+1} \left[ (\mu_{yi} - \mu_{yi}^{1})^2 - (\mu_{yi} - \mu_{yi}^{0})^2 \right]$$

If L>τ, then the watermark detector 560 declares that the watermark is present; otherwise, declares that it is not present, where τ is some threshold and an input parameter to the algorithm. Of course, there may be a range near the threshold where the determiner specifies that the watermark presence is indeterminate (e.g., if the likelihood L is close enough to threshold τ, the detector may output "inconclusive" or "unknown" as a result).

The presenter 570 may present one of three indications: "watermark present," "watermark not present," and "unknown." This information is presented on the display 580. Of course, this display may be any output device. It may also be a storage device.

The functions of aforementioned components of the exemplary statistics quantization watermark detecting system 500 of FIG. 5 are explained further below.

More Description of the Exemplary Watermarker

For the following descriptions of an implementation of the exemplary watermarker, assume the following:

Herein, the following notation is generally used: lowercase boldface letters to denote vectors and uppercase boldface letters to denote matrices. Unless otherwise specified, Euclidean norm and the corresponding inner product are used. The subscripts denote a particular element of a vector. For example $a_i$ denotes $i^{th}$ element of vector a. The superscript $^T$ denotes the transpose operator.

Also let $\mathcal{N}(A)$ represent the null space of A and $\mathcal{R}(A)$ represent the range space of A. $d_H(a, b)$ stands for the normalized Hamming distance between the equal length binary vectors a and b where the normalization is carried out by dividing the usual Hamming distance by the length of the vectors.

Problem Definition and Quantization of Random Linear Statistics

Let s denote the host data (i.e., original digital good) of dimension N×1 into which watermark w (which is an M×1 vector) to be embedded, where $w_i \in \{0, 1\}^M$, $\forall_i$. Within this notation, the rate of the watermark encoding is M/N. In order to embed $w_j$, the exemplary watermarker consider a "randomly chosen" region $\mathcal{R}$, where $\mathcal{R} \subseteq \{1,2,\ldots,N\}$ (i.e., $\mathcal{R}$ is the set of indices of elements of s to which watermark is going to be embedded. Also, for each $w_i$, the exemplary watermarker introduces "randomly chosen" weight vector, $\alpha_i$. The watermark vector w is embedded to the "random linear statistics" vector, μ, where $$\mu_i = \sum_{j \in R_i} (\alpha_{ij} s_j),$$

where $\alpha_{ij}$ is the $jt^h$ element of $\alpha_i$.

For watermark embedding, the exemplary watermarker may employ scalar uniform quantizers $Q_0$ and $Q_1$. The union of the quantization bins of $Q_0$ and $Q_1$ cover the whole real line. Moreover, each quantization bin of $Q_0$ ($Q_1$) is of length Δ and surrounded by two quantization bins of $Q_1$ ($Q_0$) each of which is of length Δ. Naturally, this is just one exemplary codebook construction; other pseudorandom and high-dimensional codes may similarly be employed for data embedding purposes.

The reconstruction levels of each quantizer are chosen randomly within the given reconstruction bin. Note that in general it is possible to choose the bins of each quantizer "randomly" in a non-overlapping fashion (within the limitations of scalar quantization).

In the more general case, one may choose the Voronoi regions of vector quantizers $Q_0$ and $Q_1$ randomly in a non-overlapping manner, within which the reconstruction levels are also chosen randomly within a hypercube centered at the reconstruction level (e.g., center of gravity) of each Voronoi region of each quantizer (the dimension of the hypercube is the dimension of the quantization).

Let $\hat{\mu}_0(\hat{\mu}_1)$ be the quantized version of μ using $Q_0$ ($Q_1$). Then watermark embedding is carried out by designing a quantization noise sequence such that the resulting statistics are equal to $\hat{\mu}$, where $$\hat{\mu}_i = \begin{cases} \{\hat{\mu}_{0i} & \text{if } w_i = 0 \\ \{\hat{\mu}_{1i} & \text{if } w_i = 1 \end{cases}$$

where $\hat{\mu}_{0i}(\hat{\mu}_{1i})$ is the $i^{th}$ element of $\hat{\mu}_0(\hat{\mu}_1)$, $1 \leq i \leq M$.

At the receiver end, the task is (knowing the secret key K) to find the random statistics of the input data and given the quantizers perform watermark decoding and detection subsequently. The receiver carries out decoding using using an approximate ML decoding rule (e.g., nearest neighbor decoding). The decision on the existence of the watermark (actual detection process) is then carried out by finding the log-likelihood ratios corresponding to $\hat{\mu}_{0i}$ and $\hat{\mu}_{1i}$ and applying thresholding on the log-likelihood ratio.

Let x be the watermarked data vector which is of size N×1. Now, the main issue at the encoder side is to "go back" from $\hat{\mu}$ to x (i.e., given s, $\{R_i\}$, $\{\alpha_i\}$, μ, and $\hat{\mu}$) find x, such that $$\sum_{j \in R_i} (x_j \alpha_{ij}) = \hat{\mu}_i, 1 \leq i \leq M.$$

In case of random and permissively overlapping regions, this task is non-trivial. The exemplary watermarker addresses this case.

The exemplary watermarker implements at least two approaches to perform quantization of random linear statistics for random and permissively overlapping regions. In one of these approaches, the exemplary watermarker performs quantization such that norm of the additive quantization noise is minimized. In the other one, the exemplary watermarker minimizes the distance of the "multiplicative quantization noise" to unity.

The following terminology is used herein:

M×1 vector d, where $d := \hat{\mu} - \mu$.

M×N matrix T where $$T_{ij} := \begin{cases} \{\alpha_{ij} & \text{if } j \in R_i \\ \{0 & \text{else} \end{cases},$$

where $T_{ij}$ is the $(i,j)^{th}$ element of T, $1 \leq i \leq M$, $1 \leq i \leq N$ N×1 vector 1, where $1_i := 1$, $1 \leq i \leq N$ Also, $Ts = \mu$ and the goal, for at least a portion of the exemplary watermarker is to find x such that $Tx = \hat{\mu}$.

Herein, it is assumed for the sake of explanation only (and not limitation) that M≦N and T is rank M.

Minimization of Additive Quantization Disturbance

In this section, the "minimization of additive quantization disturbance" approach is described. Its aim is to design x via solving the following minimization problem:

$$\min_x \|x - s\| \quad s.t. \quad Tx = \hat{\mu} \tag{1.1}$$

The solution to equation (1.1) may be represented by $$x = s + T^T(TT^T)^{-1}(\hat{\mu} - \mu) \tag{1.2}$$

Equation (1.2) provides an optimal additive quantization disturbance in the minimum Euclidean norm sense. However, often Euclidean norm is not a very good measure of perceptual quality. Such perceptual artifacts would be more common as the quantizer parameter $\Delta$ increases. Since there is still no universally accepted quality measure for perceptual quality, the exemplary watermarker employs its own approaches to decrease perceptually annoying artifacts.

Let $\hat{n}_{MN} := T^T(TT^T)^{-1}(\hat{\mu} - \mu)$. Given s, $\hat{n}_{MN}$ (and hence $x = s + \hat{n}_{MN}$), if there are perceptual artifacts created by $\hat{n}_{MN}$ in principle it is possible to design a "perceptual compensation vector" c such that it compensates for the visual artifacts created by $\hat{n}_{MN}$ (i.e., $s + \hat{n}_{MN} + c$ has fewer perceptually annoying artifacts than $s + \hat{n}_{MN}$).

However there is a problem that c might perturb $\hat{\mu}$. In general, the goal is to find c such that $Tc = 0$ (i.e., c and $\hat{n}_{MN}$ are orthogonal to each other) and "c minimizes perceptual artifacts that are initially created by $\hat{n}_{MN}$". But the notion of quantifying perceptual artifacts is not clear; therefore, it is difficult to really analytically formulate the problem.

Hence, the exemplary watermarker follows this approach:

Given $\hat{n}_{MN}$ and s, the exemplary watermarker designs C by using some experimental technique so as to decrease perceptual artifacts. Then the exemplary watermarker projects c on N(T). Let $c_N$ be the projection of C on $\mathcal{N}(T)$. The expression for $c_N$ is given below.

Given full rank M×N real matrix T and N×1 real vector c, its projection on $\mathcal{N}(T)$ is given by $$c_N = (I - T^T(TT^T)^{-1})c, \tag{1.3}$$

where I is N×N identity matrix. Note that for all possible length-N real vectors c, $c_N$ is orthogonal to $\hat{n}_{MN}$.

Therefore, to decrease perceptual artifacts, the exemplary watermarker relaxes the minimum norm constraint. Once a perceptually satisfying compensation vector c is found, the exemplary watermarker uses its projection on $\mathcal{N}(T)$ (via equation (1.3)) and add resulting $c_N$ to initially watermarked data. In principle this operation can be repeated an infinite number of times to ensure perceptual satisfaction.

Examples of other possible approaches to find c include:

Once $\hat{n}_{MN}$ is found, apply an FIR low pass filter on it. Let c be the difference between filtered version of $\hat{n}_{MN}$ and non-filtered version of $\hat{n}_{MN}$.

Apply equation (1.3) to find $c_N$. Then updated watermarking quantization noise is given by $\hat{n}_{MN} + c_N$.

Another approach to decrease perceptibly annoying artifacts could be to find a compensation vector c such that $c \in \mathcal{N}(T)$ and $\hat{n}_{MN} + c$ is bandlimited (i.e., smooth enough). Under some mild assumptions, the solution to this approach is given below:

Let D be the size K×N submatrix of N×N DFT (or any frequency decomposition or approximately decorrelating transform, such as DST, DCT, etc.) matrix such that Da gives the (possibly approximate) DFT (or any frequency decomposition or approximately decorrelating transform, such as DST, DCT, etc.) coefficients of a $\in R^N$ in the frequency range $[\pi - \pi K/N, \pi + \pi K/n]$. Then let $c^*$ be the minimum norm solution to c such that $\hat{n}_{MN} + c$ is bandlimited to $[0, \pi - \pi K/N]$ and the quantization condition $$T(s + \hat{n}_{MN} + c) = \hat{\mu} \tag{1.4}$$

is satisfied. The result is, $$c^* = A^T(AA^T)^{-1}b, \tag{1.5}$$

where $$A = \begin{bmatrix} T \\ D \end{bmatrix} \text{ and } b = \begin{bmatrix} 0 \\ -D\hat{n}_{MN} \end{bmatrix}$$

assuming that M+K<N and A is full rank.

Minimization of Multiplicative Quantization Disturbance

In this section, the "minimization of multiplicative quantization disturbance" approach is described. Its aim is to design x via solving the following minimization problem:

$$\min_x \|n - 1\| \quad s.t. \quad Tx = \hat{\mu} \tag{1.6}$$

where $x_i = n_i s_i$, $1 \leq i \leq N$.

The solution to equation (1.6) may be represented by $$x_i = \hat{n}_i s_i, \quad 1 \leq i \leq N \tag{1.7}$$

where $$\hat{n} = 1 + ST^T(TS^2T^T)^{-1}(\hat{\mu} - \mu). \tag{1.8}$$

and S is an N×N diagonal matrix such that $S_{ii} = s_i$.

Methodological Applications

Application of the Exemplary Watermarker to Image Watermarking

The exemplary watermarker may employ at least one of two private blind image watermarking approaches when watermarking digital images. Both approaches embed watermark to a digital image in the DC subband of a DWT (discrete wavelet transform) via quantization of first order statistics of randomly chosen polygons.

One approach minimizes the norm of additive quantization disturbance (i.e., uses the result of equation (1.2)). The other approach minimizes the distance of multiplicative quantization disturbance to unity (i.e., uses the result of equation (1.7)).

Watermark Embedding

Figure 6:
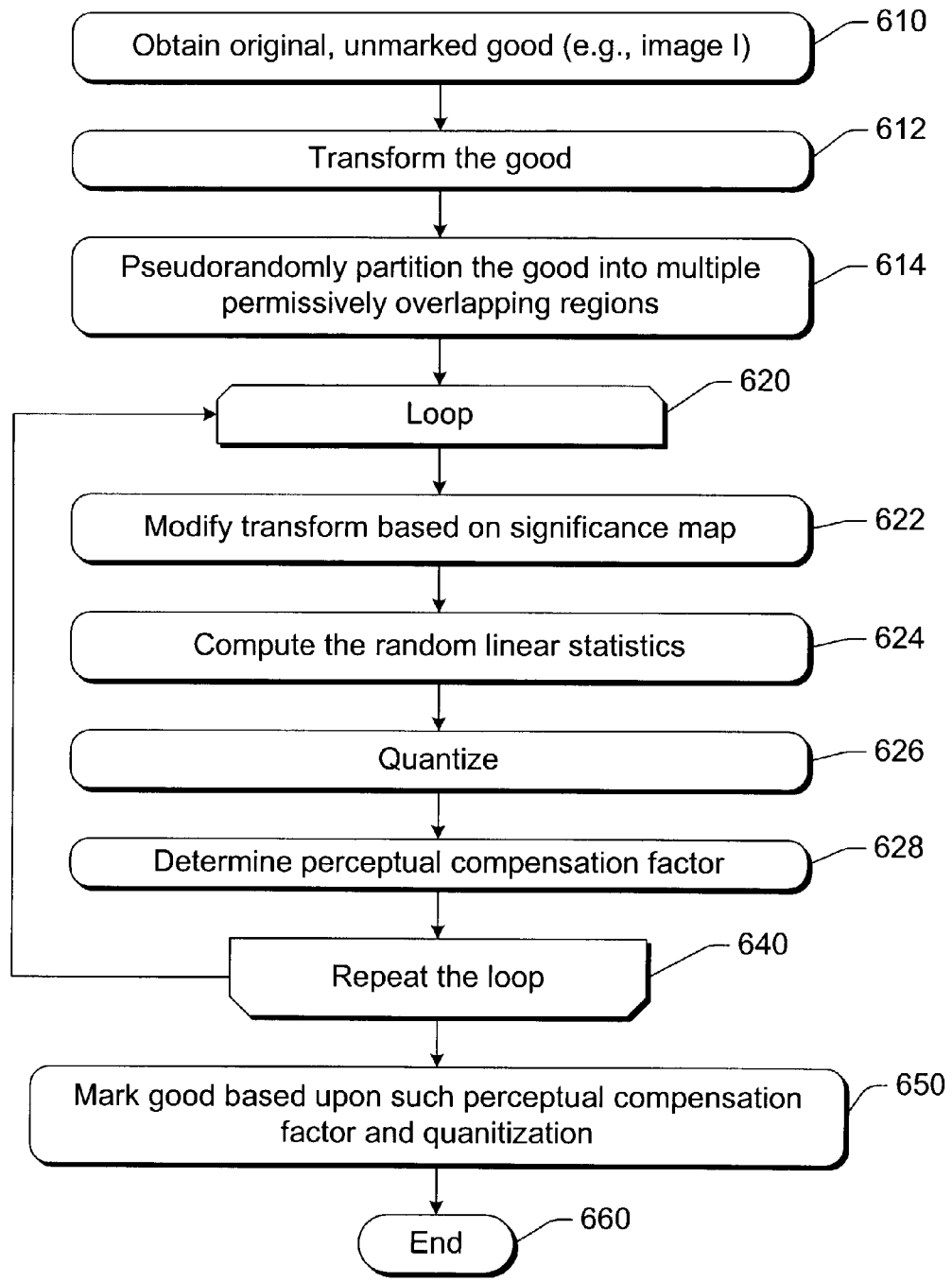
FIG. 6 is a flow diagram showing an illustrative methodological implementation (e.g., watermark embedding) described herein.

FIG. 6 shows the methodological implementation of the exemplary statistics quantization watermark embedding system 400 (or some portion thereof). This methodological implementation may be performed in software, hardware, or a combination thereof.

At 610 of FIG. 6, the exemplary watermarker obtains the original good, such as input image I.

At 612, the exemplary watermarker transforms image I. It resizes it to a fixed size via bicubic interpolation. The exemplary watermarker applies DWT to resulting image and obtains the DC subband, $I_{DC}$. Let N be the number of coefficients in $I_{DC}$. The exemplary watermarker reorders $I_{DC}$ to get N×1 host data s.

At 614, given length-M watermark vector $w \in \{0, 1\}^M$, the exemplary watermarker partitions the image to generate regions. Such regions are permissively overlapping.

It randomly generate sufficiently large M regions represented by $$\{R_i\}_{i=1}^M$$

together with corresponding strictly positive pseudorandom weights $$\{\alpha_i\}_{i=1}^M,$$

thereby forming the corresponding random transformation matrix $T_1$ of size M×N. (In one implementation, the same value of random weight is used for each region in order to withstand shifting rotation cropping, etc.)

A loop starts at 620, so that everything between 620–640 (inclusive) is repeated multiple times.

At 622 of FIG. 6, the exemplary watermarker determines the significant coefficient locations in DC subband by applying thresholding at $2^{nd}$ level AC subbands. Based on this significance map, the exemplary watermarker modifies $T_1$ to get T where T is obtained by deleting the columns of $T_1$ that correspond to the insignificant coefficients according to the significance map. T shall be used in determining the quantization noise, $T_1$ shall be used in finding the random linear statistics.

At 624, the exemplary watermarker computes the random linear statistics of s: $\mu = T_1 s$. It determines the watermark embedded quantized statistics, $\hat{\mu}$:

$$\hat{\mu}_i = \begin{cases} \{Q_0(\mu_i) \text{ if } w_i = 0 \\ \{Q_1(\mu_i) \text{ if } w_i = 1, \end{cases}$$

where $Q_0$ and $Q_1$ are two uniform scalar quantizers with step size $\Delta$ each bin of $Q_0(Q_1)$ is surrounded by two bins of $Q_1(Q_0)$ and reconstruction levels are chosen randomly within a specified area for each bin centered around the center of the corresponding bin.

At 626 of FIG. 6, the exemplary watermarker determines the minimum norm (for additive quantization disturbance) quantization noise $\hat{n} = T^T(TT^T)^{-1}(\hat{\mu} - \mu)$. Alternatively, it may determine the multiplicative quantization disturbance to unity (using equation (1.7)).

At 628, the exemplary watermarker determines a perceptual-compensation factor (i.e., vector). It applies IDWT on $\hat{n}$ to go back to spatial domain (assuming zero entries in all high frequency subbands). Let e be the spatial domain representation. It takes the two-dimensional DCT of e, call it f. It retains the low-frequency portion of f (via windowing in DCT domain) and applies IDCT to it. Let the result be $e_1$.

It applies an FIR low pass filter on $e_1$ to get $e_2$ (use all ones filter for simplicity). It finds the components of $e_2$ whose absolute values exceed some user determined value, clip those coefficients to that user determined value. Let the outcome be $e_3$.

Furthermore, the exemplary watermarker finds the "perceptual compensation vector", $c = e_3 - e$. It applies DWT to c, get the component in the $2^{nd}$ level DC subband, let $c_1$ represent that vector. It projects $c_1$ on nullspace of T to get $c_2$: $c_2 = c_1 - T^T(TT^T)^{-1}Tc_1$.

It applies IDWT to $c_2$ to go back to spatial domain to get $c_3$. It updates equation on iteration: $e = e + c_3$.

At 640 of FIG. 6, the exemplary watermarker repeats blocks 620–640 (inclusive) either until it converges or a specified maximum number of iterations is achieved.

At 650, the watermarked data is given by $x = s + e$ where e is found at the end of iteration. It marks the good. At 660, the process ends.

Figure 7:
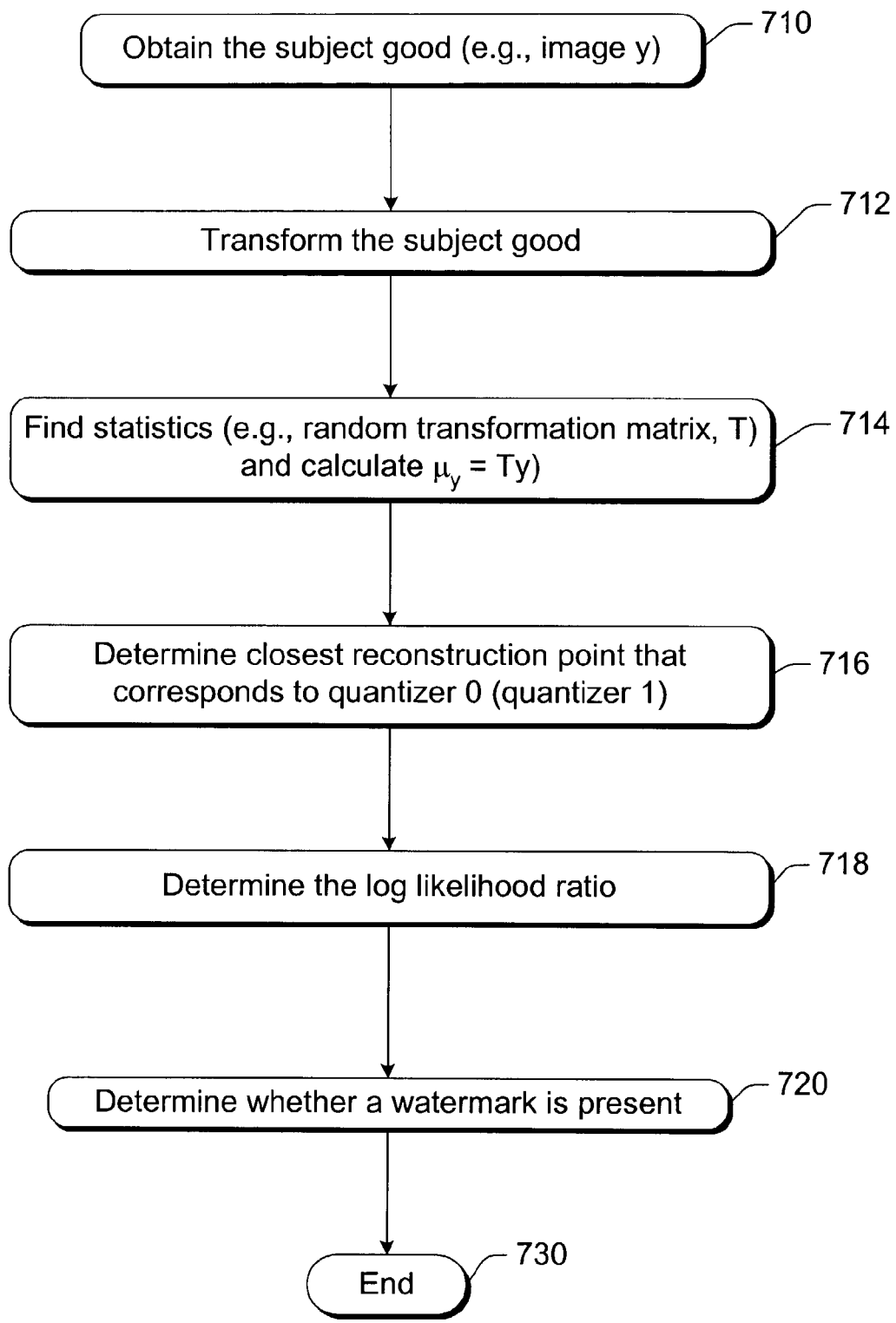
FIG. 7 is a flow diagram showing an illustrative methodological implementation (e.g., watermark detecting) described herein

Watermark Detection:

FIG. 7 shows the methodological implementation of the exemplary statistics quantization watermark detecting system 500 (or some portion thereof). This methodological implementation may be performed in software, hardware, or a combination thereof.

At 710 of FIG. 7, the exemplary watermarker obtains a subject good, such as input image $\tilde{I}$.

At 712, the exemplary watermarker transforms the image. It resizes it to a fixed size via bicubic interpolation, applies DWT to resulting image, and obtains the DC subband, $\tilde{I}_{DC}$. Let N be the number of coefficients in $\tilde{I}_{D}C$ The exemplary watermarker reorders $\tilde{I}_{DC}$ to get N×1 input data y.

At 714, the exemplary watermarker forms the random transformation matrix, T, in the same manner as block 630 of FIG. 6. It also determines $\mu_y = Ty$.

At 716, for $i^{th}$ component of $\mu_y$ (which is represented by $\mu_{yi}$), the exemplary watermarker determines the closest reconstruction point that corresponds to quantizer 0 (quantizer 1) and call it $$\mu_{yi}^0(\mu_{yi}^1)$$

(i.e., nearest neighbor decoding).

At 718, the exemplary watermarker determines the log likelihood ratio:

$$L = \sum_{i=1}^M (-1)^{w_i+1}\left[(\mu_{yi} - \mu_{yi}^1)^2 - (\mu_{yi} - \mu_{yi}^0)^2\right]$$

At 720, if $L > \tau$, then the exemplary watermarker declares that the watermark is present; otherwise, declares that it is not present. The process ends at 730. Naturally, if L is close enough to $\tau$, then the detector may be unable to produce any result and hence output "inconclusive" or "unknown".

Application to Audio Watermarking

The exemplary watermarker may employ at least one of the private blind image watermarking approaches when watermarking digital audio signals. The approach is to embed watermark to a given audio clip in the log magnitude domain after MCLT (Modulated Complex Lapped Transform) via quantization of first order statistics of randomly chosen rectangles. A particular frequency band is chosen to embed the watermark data where the essential information of the audio clip lies.

The exemplary watermarker may minimize the norm of additive quantization disturbance (see equation (1.2)) or it may minimizes the distance of multiplicative quantization disturbance to unity (see equation (1.7)).

Watermark Embedding

Figure 8:
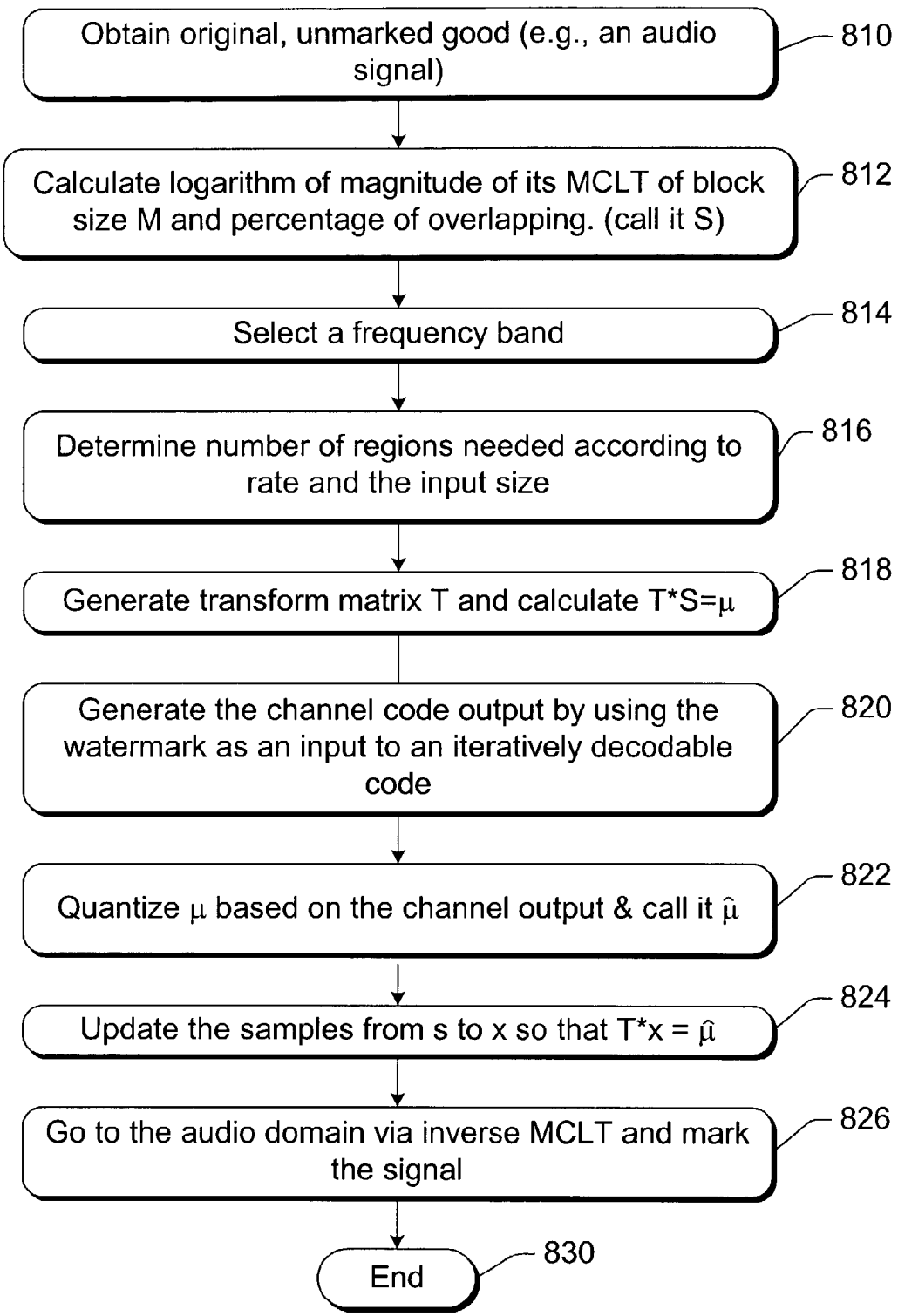
FIG. 8 is a flow diagram showing an illustrative methodological implementation (e.g., watermark embedding) described herein.

FIG. 8 shows the methodological implementation of the exemplary statistics quantization watermark embedding system 400 (or some portion thereof). This methodological implementation may be performed in software, hardware, or a combination thereof.

At 810 of FIG. 8, the exemplary watermarker obtains the original good, such as input audio signal.

At 812, the exemplary watermarker calculates the logarithm of the magnitude of its MCLT of block size M=2048 and 50% overlapping. Call it S.

At 814, the exemplary watermarker selects a frequency band of 500 Hz to 10 k Hz.

At 816 of FIG. 8, the exemplary watermarker determines the number of regions needed according to rate and the input size.

At 818 of FIG. 8, based on the key, required number of regions and the hearing thresholds, the exemplary watermarker generates the transform matrix T. It then calculates T*S=$\mu$. This $\mu$ vector is the statistics to be quantized.

At 820, it generates the channel code output by using the watermark as an input to an iteratively decodable code.

At 822, the exemplary watermarker quantizes $\mu$ based on the channel output and call it $\hat{\mu}$.

At 824, the exemplary watermarker updates the samples from S to X so that T*X=$\hat{\mu}$.

At 826, the exemplary watermarker goes to the audio domain via inverse MCLT and mark the signal. At 830, the process ends.

Figure 9:
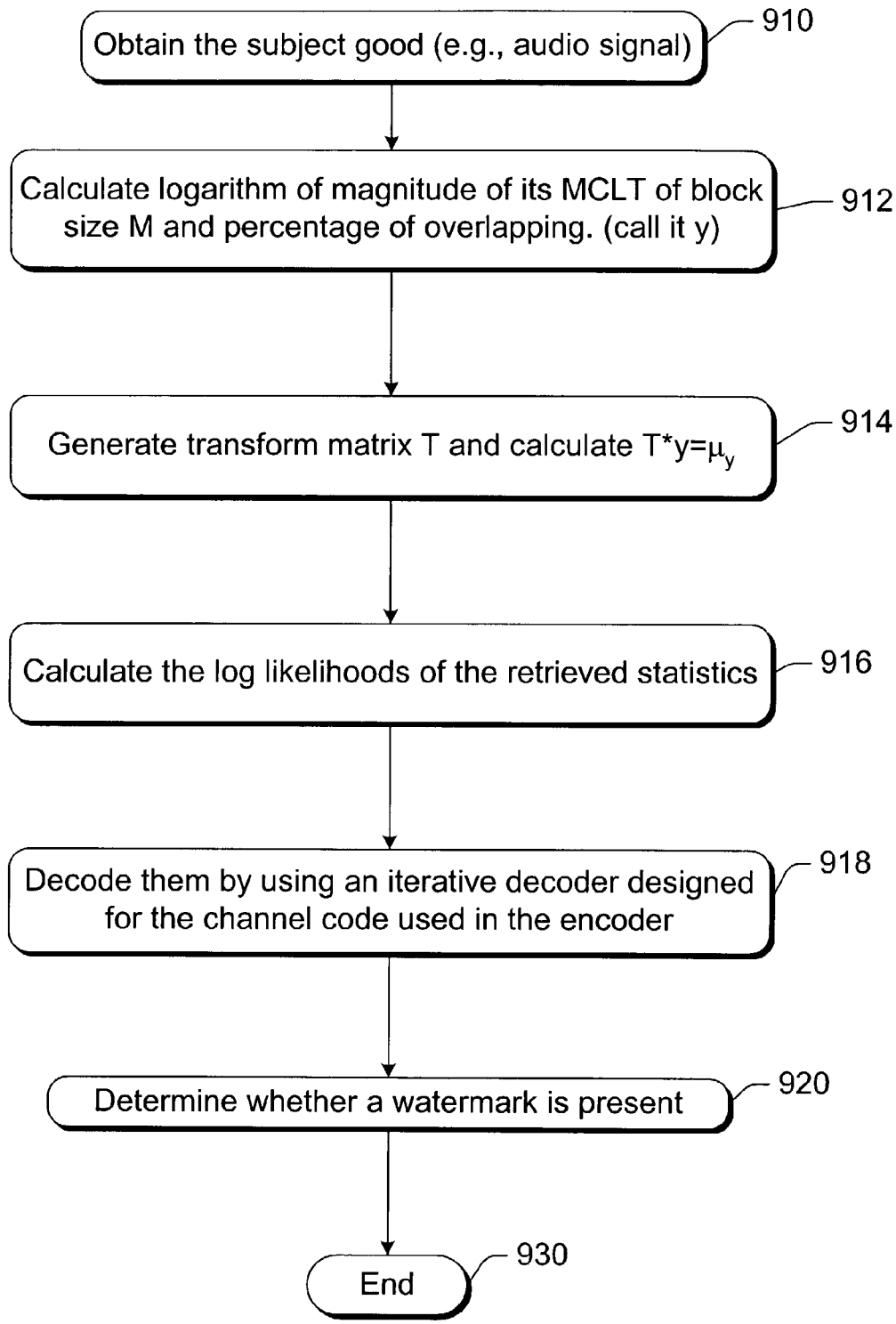
FIG. 9 is a flow diagram showing an illustrative methodological implementation (e.g., watermark detecting) described herein

Watermark Detection:

FIG. 9 shows the methodological implementation of the exemplary statistics quantization watermark detecting system 500 (or some portion thereof). This methodological implementation may be performed in software, hardware, or a combination thereof.

At 910 of FIG. 9, the exemplary watermarker obtains a subject good, such as input audio signal.

At 912, the exemplary watermarker calculates the logarithm of the magnitude of its MCLT of block size M=2048 and 50% overlapping. Call it Y.

At 914, based on the key, the exemplary watermarker generates the transform matrix T. It then calculates the statistics as T*Y=$\mu_y$.

At 916, the exemplary watermarker calculates the log likelihoods of the retrieved statistics.

At 918, it decodes them by using an iterative decoder designed for the channel code used in the encoder.

At 920, the exemplary watermarker compares the resultant log likelihoods with the threshold and declare watermark existence if the former greater than the latter.

The process ends at 930.

Exemplary Computing System and Environment

FIG. 10 illustrates an example of a suitable computing environment 1000 within which an exemplary watermarker, as described herein, may be implemented (either fully or partially). The computing environment 1000 may be utilized in the computer and network architectures described herein.

The exemplary computing environment 1000 is only one example of a computing environment and is not intended to suggest any limitation as to the scope of use or functionality of the computer and network architectures. Neither should the computing environment 1000 be interpreted as having any dependency or requirement relating to any one or combination of components illustrated in the exemplary computing environment 1000.

The exemplary watermarker may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary watermarker may be described in the general context of computer-executable instructions, such as program modules, being executed by a computer. Generally, program modules include routines, programs, objects, components, data structures, etc. that perform particular tasks or implement particular abstract data types. The exemplary watermarker may also be practiced in distributed computing environments where tasks are performed by remote processing devices that are linked through a communications network. In a distributed computing environment, program modules may be located in both local and remote computer storage media including memory storage devices.

The computing environment 1000 includes a general-purpose computing device in the form of a computer 1002. The components of computer 1002 may include, by are not limited to, one or more processors or processing units 1004, a system memory 1006, and a system bus 1008 that couples various system components including the processor 1004 to the system memory 1006.

The system bus 1008 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1002 typically includes a variety of computer readable media. Such media may be any available media that is accessible by computer 1002 and includes both volatile and non-volatile media, removable and non-removable media.

The system memory 1006 includes computer readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 may also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD-ROM, or other optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 may be connected to the system bus 1008 by one or more interfaces (not shown).

The disk drives and their associated computer-readable media provide non-volatile storage of computer readable instructions, data structures, program modules, and other data for computer 1002. Although the example illustrates a hard disk 1016, a removable magnetic disk 1020, and a removable optical disk 1024, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 1016, magnetic disk 1020, optical disk 1024, ROM 1012, and/or RAM 1010, including by way of example, an operating system 1026, one or more application programs 1028, other program modules 1030, and program data 1032.

A user may enter commands and information into computer 1002 via input devices such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device may also be connected to the system bus 1008 via an interface, such as a video adapter 1044. In addition to the monitor 1042, other output peripheral devices may include components such as speakers (not shown) and a printer 1046 which may be connected to computer 1002 via the input/output interfaces 1040.

Computer 1002 may operate in a networked environment using logical connections to one or more remote computers, such as a remote computing device 1048. By way of example, the remote computing device 1048 may be a personal computer, portable computer, a server, a router, a network computer, a peer device or other common network node, and the like. The remote computing device 1048 is illustrated as a portable computer that may include many or all of the elements and features described herein relative to computer 1002.

Logical connections between computer 1002 and the remote computer 1048 are depicted as a local area network (LAN) 1050 and a general wide area network (WAN) 1052. Such networking environments are commonplace in offices, enterprise-wide computer networks, intranets, and the Internet.

When implemented in a LAN networking environment, the computer 1002 is connected to a local network 1050 via a network interface or adapter 1054. When implemented in a WAN networking environment, the computer 1002 typical includes a modem 1056 or other means for establishing communications over the wide network 1052. The modem 1056, which may be internal or external to computer 1002, may be connected to the system bus 1008 via the input/output interfaces 1040 or other appropriate mechanisms. It is to be appreciated that the illustrated network connections are exemplary and that other means of establishing communication link(s) between the computers 1002 and 1048 may be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048. For purposes of illustration, application programs and other executable program components such as the operating system are illustrated herein as discrete blocks, although it is recognized that such programs and components reside at various times in different storage components of the computing device 1002, and are executed by the data processor(s) of the computer.

Computer-Executable Instructions

An implementation of an exemplary watermarker may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 10 illustrates an example of a suitable operating environment 1000 in which an exemplary watermarker may be implemented. Specifically, the exemplary watermarker(s) described herein may be implemented (wholly or in part) by any program modules 1028–1030 and/or operating system 1026 in FIG. 10 or a portion thereof.

The operating environment is only an example of a suitable operating environment and is not intended to suggest any limitation as to the scope or use of functionality of the exemplary watermarker(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary watermarker may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable medium having computer-executable instructions that, when executed by a computer, performs a method facilitating protection of digital goods, the method comprising:
   obtaining a digital good;
   transforming the good;
   partitioning the transform of the good into a plurality of permissively overlapped regions, wherein the partitioning comprises segmenting the transform into a plurality of overlapped regions;
   calculating statistics of one or more the regions of the plurality, so that the statistics of a region are representative of it;
   quantizing such statistics;
   generating a perceptual-compensation factor, which is an approximate representation a combination of the quantized statistics of the plurality of the regions the generating comprises finding a minimum distance of multiplicative quantization disturbance;
   marking the digital good with the perceptual-compensation factor.

2. A medium as recited in claim 1, wherein the partitioning further comprises pseudorandomly segmenting the transform into a plurality of regions.

3. A medium as recited in claim 1, wherein the statistics of the calculating comprises one or more finite order moments of a segment.

4. A medium as recited in claim 1, wherein the marking comprises embedding a watermark via quantization.

5. A computer comprising one or more computer-readable media as recited in claim 1.

6. A computer-readable medium having computer-executable instructions that, when executed by a computer, performs a method facilitating protection of digital goods, the method comprising:
   transforming a digital good;
   partitioning the transform of the good into a plurality regions, wherein the partitioning comprises segmenting the transform into a plurality of overlapped regions;
   calculating statistics of regions, so that the statistics of a region are representative of it;
   generating a quantization-noise factor, which is an approximate representation a quantization of the statistics the plurality of regions the generating comprises finding a minimum distance of multiplicative quantization disturbance;
   marking the digital good with the quantization-noise factor.

7. A medium as recited in claim 6, wherein the partitioning comprises pseudorandomly segmenting the transform into a plurality of regions.

8. A medium as recited in claim 6, wherein the statistics of the calculating comprises one or more finite order moments of a region.

9. A medium as recited in claim 6, wherein the generating a quantization-noise factor comprises:
   finding a minimum norm quantization noise vector such that watermarked data have quantized statistics;
   perceptually correcting the minimum noise vector with a perceptual compensation vector.

10. A medium as recited in claim 6, wherein the marking comprises embedding a watermark via quantization.

11. A computer comprising one or more computer-readable media as recited in claim 6.

* * * * *